United States Patent [19]

Wilson

[11] Patent Number: 4,948,493
[45] Date of Patent: Aug. 14, 1990

[54] METHOD AND APPARATUS FOR CLARIFYING USED LUBRICATING OIL

[76] Inventor: Lowell A. Wilson, 2349 Fairview St., Burlington, On, Canada, L7R 2E3

[21] Appl. No.: 364,886

[22] Filed: Jun. 12, 1989

Related U.S. Application Data

[63] Continuation of Ser. No. 203,712, Jun. 7, 1988, abandoned, which is a continuation of Ser. No. 13,997, Feb. 5, 1987, abandoned.

[51] Int. Cl.$^5$ .............................................. C10G 29/00
[52] U.S. Cl. ...................................... 208/179; 196/46; 196/119; 196/121; 208/180
[58] Field of Search ................ 196/46, 46.1, 118, 119, 196/120, 121; 210/122, 175, 176, 723; 137/172, 399, 434; 208/179, 180

[56] References Cited

U.S. PATENT DOCUMENTS

| | | | |
|---|---|---|---|
| 1,283,916 | 11/1918 | Rogers | 137/399 |
| 1,640,415 | 8/1927 | Langston | 196/119 |
| 1,771,684 | 7/1930 | Miller | 196/46 |
| 1,985,663 | 12/1934 | Lowery | 137/399 |
| 2,012,695 | 8/1935 | Shillaber | 196/46 |
| 2,202,657 | 5/1940 | Holt | 196/121 |
| 2,290,461 | 7/1942 | Young | 137/399 |
| 2,319,598 | 5/1943 | Harris | 196/46 |
| 2,496,888 | 2/1950 | Palmer | 196/46 |
| 2,603,588 | 7/1952 | Vaughan et al. | 196/46 |
| 2,858,843 | 11/1958 | Muller | 210/122 |
| 3,351,083 | 11/1967 | Sait | 137/399 |

FOREIGN PATENT DOCUMENTS 1380992 1/1975 United Kingdom .............. 210/122

Primary Examiner—Joye L. Woodard
Attorney, Agent, or Firm—Jacox & Meckstroth

[57] ABSTRACT

A tank is suspended in an enclosure and defines therebetween a chamber completely surrounding the tank. A fluid or air within the chamber is heated to create a thermal blanket and an oven-like condition completely around the tank to maintain the tank and used oil and coagulant within the tank at a substantially constant temperature for an extended period of time for settling of contaminants towards the bottom of the tank. Clean oil remaining at the top of the tank is removed for reuse. The invention is particularly useful for heavy users of lubricating oil such as railroads or shipping companies.

7 Claims, 3 Drawing Sheets

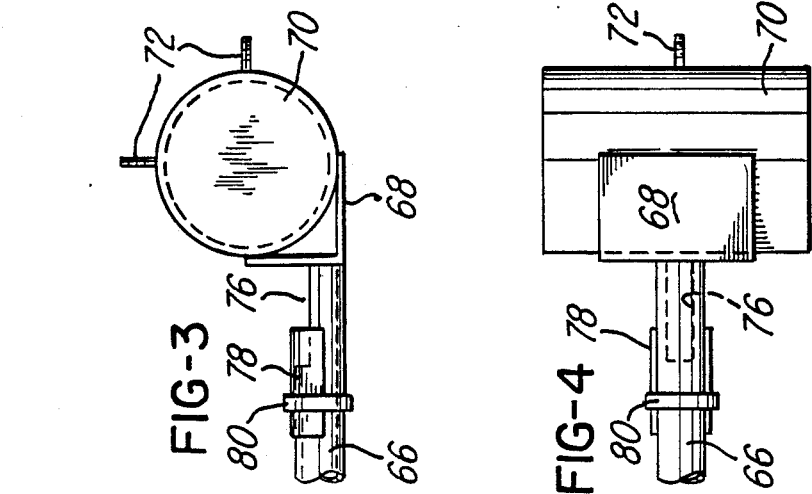
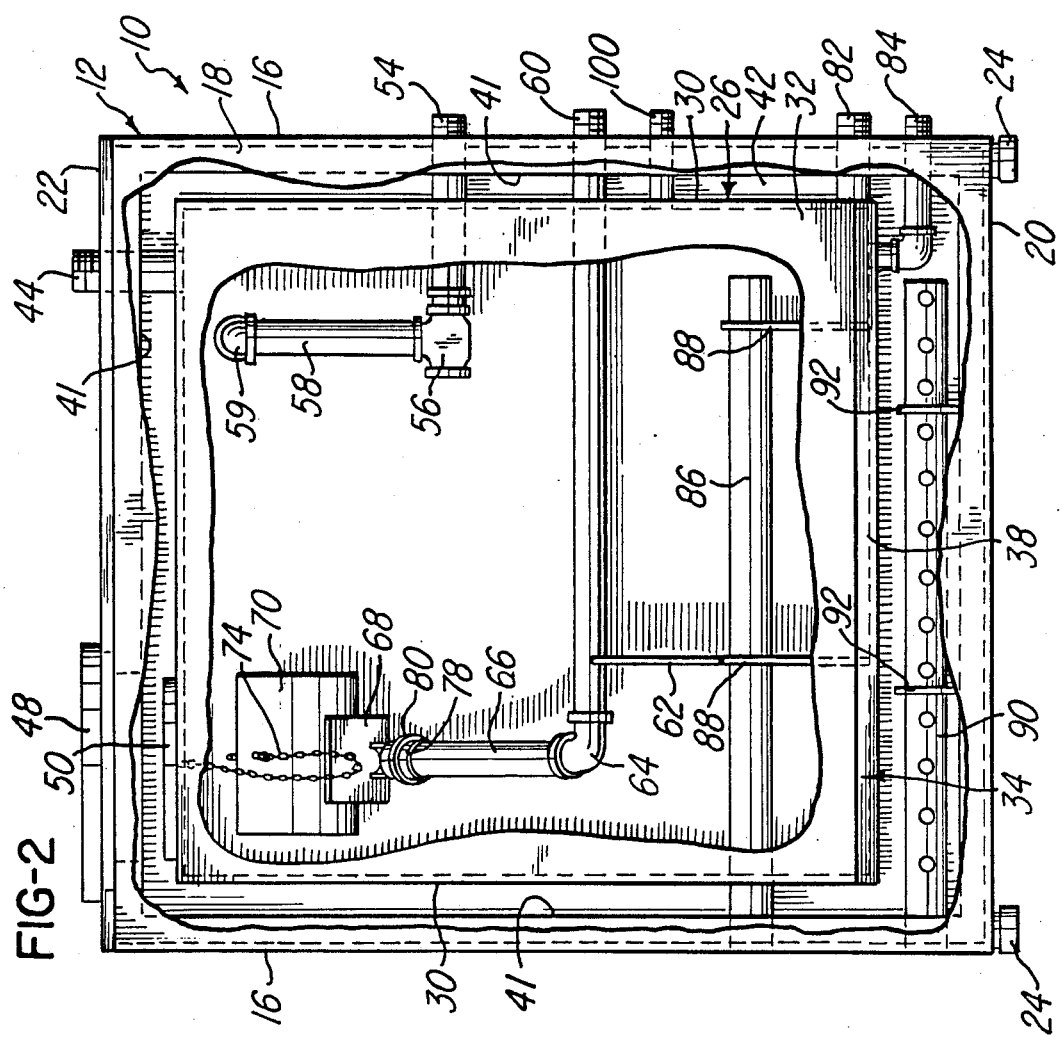

METHOD AND APPARATUS FOR CLARIFYING USED LUBRICATING OIL

RELATED APPLICATION

This is a continuation of application Ser. No. 203,712, filed Jun. 7, 1988, abandoned, which is a continuation of application Ser. No. 013,997, filed Feb. 5, 1987, now abandoned.

BACKGROUND OF THE INVENTION

There are certain industries which utilize extremely large quanties of lubricating oil, and the oil is usually discarded as waste after removal from an engine. The railway industry is one particular example of an industry using vast quantities of lubricating oil. Heretofore, there has been no cost-effective way of cleaning the used oil of contaminants such that the cleaned oil could be used again. Either the quality of the cleaned oil has not been sufficient for re-use in the same environment or the process of obtaining good quality oil has not been cost-effective.

SUMMARY OF THE INVENTION

The present invention relates to an improved method and apparatus for cleaning used oil. A recent development in Great Britain by the British Railways Board of a new coagulant has made the concept of oil recovery more viable than ever before. The new coagulant is available in Canada from Zimmark Inc. of Burlington Ontario under the trademark LAUNDEROL. It is a blend of organic compounds some of which are neutral, some alkaline and some polymeric. It does not contain hydrocarbons. It is effective to remove and cause nearly all harmful contaminants to settle towards the bottom of a tank containing used oil, leaving clean reusable oil in the upper portion of the tank.

The present invention relates to apparatus and method for reclaiming used oil using the LAUNDEROL coagulant. Although devised initially around the LAUNDEROL coagulant, the apparatus and method of the invention are operable with other coagulants although the efficiency of operation may not be as high.

The main piece of apparatus is an oil clarifier, essentially a tank suspended within a larger housing in such a manner that the space between the tank and housing is both insulated and heatable so as to keep or maintain the tank at a desired operating temperature. The tank itself also contains heaters for heating the oil, and there are appropriate conduits for introducing oil and coagulant into the tank, ventilating the tank, removing waste oil from the tank, sampling the quality of oil in the tank and removing clean oil from the tank. There are also sensors and controls for regulating the temperature and the level of oil in the tank.

The main element for clean oil removal is a pivotable conduit or arm which has a float at the free end thereof. An opening in the arm is held just below the top of the oil in the tank by the float and once a quantity of clean oil has been obtained in the tank above the waste oil, a pump is activated to draw clean oil through the opening and to send it through a filter to a clean oil tank. A chain on the float prevents it from descending so low in the tank that the opening would go into the waste oil portion.

The method of the invention involves several steps, the first of which is the filling of the tank. Thereafter, the oil is brought up to a temperature of about 110° C. Oil is taken from the tank and circulated by a pump to the top portion of the tank where the oil is sprayed on the surface of the oil to dry the oil. The air space above the oil is force ventilated. Thereafter the oil continues to circulate but the heaters in the oil are turned off so that the temperature drops to about 90° C. The heaters in the air space between the tank and the enclosure are turned on to keep or maintain the oil in the tank at about 90° C. and then the coagulant is introduced at a rate of about 1½ to 4% by volume into the circulating oil.

After coagulant introduction, the oil is allowed to stand quietly at the 90° C. temperature until the contaminants have settled to the lower section of the tank, with the clean oil on top. The clean oil is skimmed from the tank as described above, and then the waste oil is drawn from the bottom of the tank and sent to a waste oil dump. The clean oil, obtained from this process, is filtered as a final cleansing or polishing step and is then available for reuse.

The present invention will be described in greater detail hereinafter and with reference to the drawings.

BRIEF DESCRIPTION OF THE DRAWINGS

FIG. 2 is an end view, with portions cut away, of the oil clarifier of FIG. 1;

FIG. 3 is a partial elevational view of the oil skimmer used with this invention;

FIG. 4 is a partial bottom plan view of the oil skimmer shown in FIG. 3; and

DESCRIPTION OF THE PREFERRED EMBODIMENT

Figure 1:
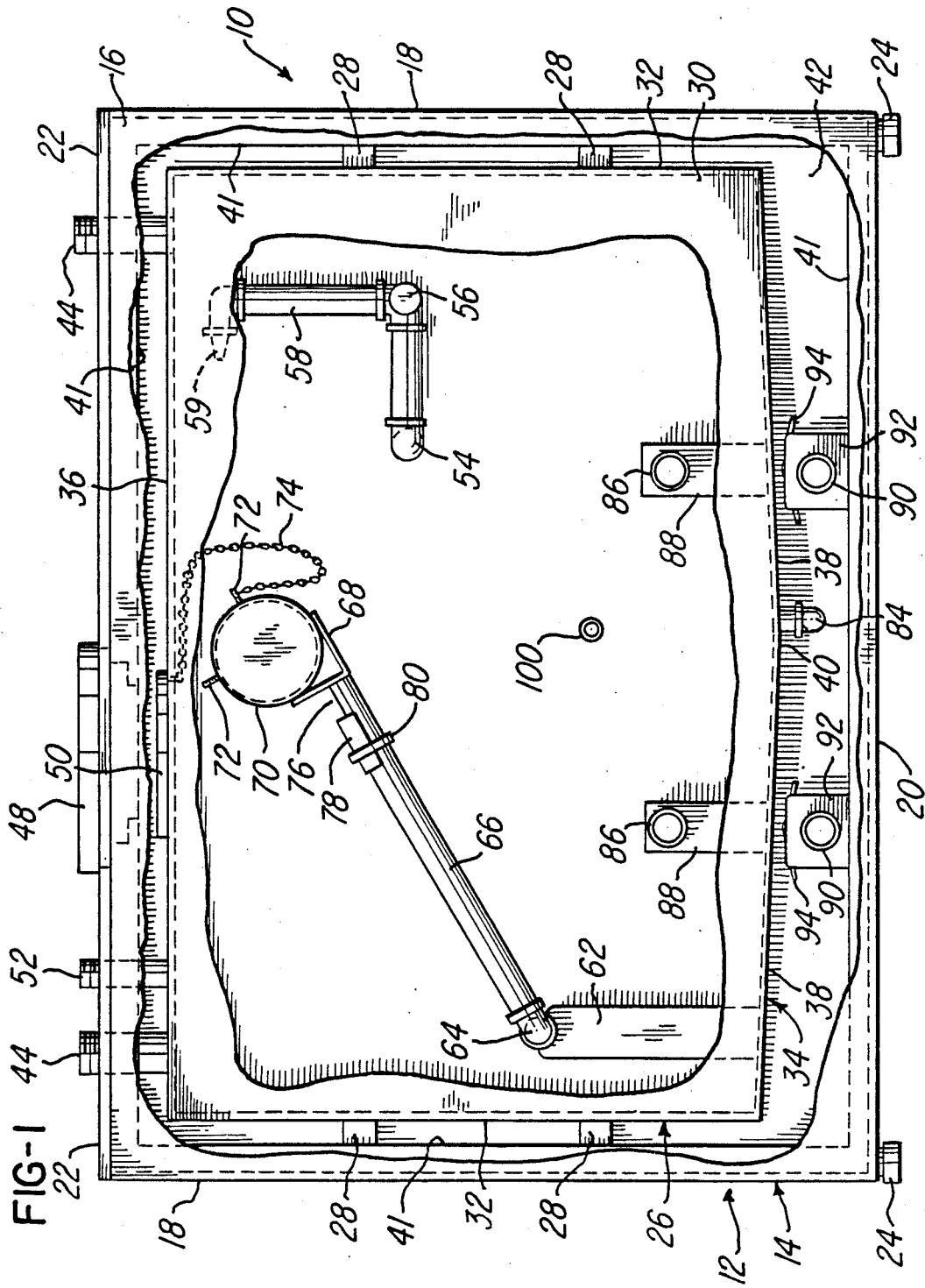
FIG. 1 is an elevation view, with portions cut away, of the oil clarifier of this invention.

FIGS. 1 and 2 show an oil clarifier 10 including a large tank 12 which might measure, for example, 5 ft. by 4 ft. by 5 ft. (length, width, height) for a capacity of 550 U.S. gallons to 10 ft. by 8 ft. by 6 ft. for a capacity of 3200 U.S. gallons. The tank 12 actually comprises an outer housing or enclosure 14 including side, end, bottom and top walls 16, 18, 20, and 22, respectively. The top wall 22 should have removable covers for access to the interior. If desired, the enclosure 14 can rest on feet 24 attached to the bottom wall 20.

A tank 26 is suspended within the enclosure 14 by supports 28. The details of the manner of support do not form a part of this invention and are omitted from the drawings for the sake of clarity. The supports 28 are intended to represent an appropriate, strong and secure system by which the tank 26 is held within the enclosure, 14, which system is well within the purview of a skilled engineer.

The tank 26 includes side, end, bottom and top walls 30, 32 34, and 36, respectively, and the bottom wall 34 includes two flat sections 38 which slope downwardly to a lowermost point 40. A layer 41 of thermal insulation material, such as an appropriate thickness of a foil-backed FIBERGLAS (Trademark) Type 545 insulation material with the foil facing the tank 26, is mounted on the inner surfaces of the walls of the enclosure 14. An air space or chamber 42 is defined between the insulation layers 41 and the tank 26 and extends completely around the tank 26.

As shown in FIGS. 1 and 2, a plurality of conduits enter and leave the tank 26 and the enclosure 14. Most of the conduits are sections or lengths of pipe which terminate outside the enclosure 14 with appropriate threaded ends for connection to other conduits which form part of the overall system, as will be described later with reference to FIG. 5.

A pair of conduits 44 extend through the top walls 22 and 36 for communication with the upper interior of tank 26. These conduits may be connected to a fan 46 (FIG. 5) which may be used to extract fumes or other gases from the tank 26. The top wall 22 also has a removable cover 48 providing for an access opening to the enclosure 14, and a second cover 50, provides access to the tank 26 below the cover 48. A portion of the insulation above the cover 50 is removable to provide access to the cover 50.

A conduit 52 passes through top walls 22 and 36 and provides means for introducing oil into the tank 26. A conduit 54 enters through the side wall 30 and provides for returning a mixture of oil and coagulant to the system for further processing. The conduit 54 extends into tank 26 to an elbow 56 and has a portion 58 which extends upwardly to a spray nozzle 59 for spraying oil into the upper portion of the tank.

A conduit 60 extends through side walls 16 and 30 of the enclosure 14 and tank 26, respectively, and is supported by an upright 62 within tank 26. The conduit 60 is connected by a swivelable elbow 64 to a conduit arm 66 extending upwardly at an angle within the tank. The arm 66 terminates at an L-shaped bracket 68 (FIGS. 2-4) which is welded to the arm. The bracket 68 supports a hollow cylindrical float 70 to which are attached radially extending pins 72. One end of a flexible chain 74 (FIG. 1) is connected to either pin 72, and the other end of the chain 74 is preferably connected to the access cover 50. FIGS. 3 and 4 show the float 70 and bracket 68 in greater detail. FIG. 3 also shown an opening 76 cut in the end of arm 66 with a semi-cylindrical cover 78 partially covering the opening 76. The size of the opening is adjustable by moving the cover 78 axially along the arm 66, and the cover is held in place by a circular adjustable hose clamp 80.

Figure 5:
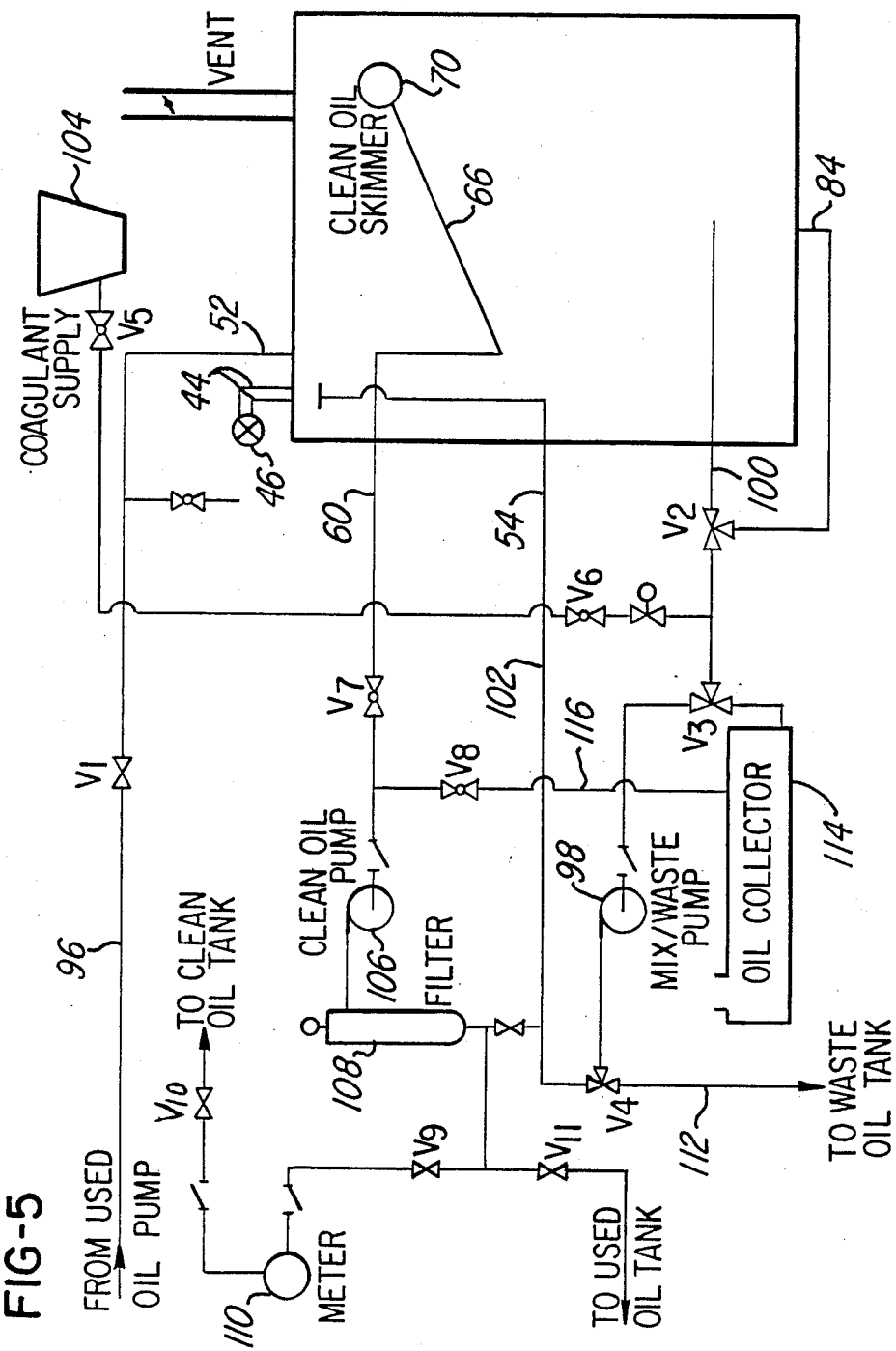
FIG. 5 is a schematic representation of the system of this invention.

A conduit 82 extends through the walls 16 and 30 and acts as an emergency drain for the tank 26. The conduit 82 could be connected to an evacuation pump, if desired. A conduit 84 extends through the wall 16 and is connected to the bottom of the tank 26 through the bottom wall 34 adjacent the lowermost point 40. This conduit 84 is the normal drain for the tank 26 as also shown in FIG. 5.

A set of conduits 86 extend through the walls 16 and 30 well into the tank and are supported by uprights 88. These conduits are intended to carry electrical heaters, hot air or steam so as to keep oil within the tank within a desired temperature range. A set of perforated conduits 90 extend through wall 16 into the space between the bottom walls 20 and 34, are supported by uprights 92, and are covered by angled plates 94. The conduits 90 also carry heated air to the space or chamber 42 between the enclosure 14 and tank 26.

Although not specifically shown in FIGS. 1-4, the oil clarifier of this invention will typically be provided with certain safety devices, such as high and low oil level alarms and/or cut-off devices, and air and oil temperature sensors. The clarifier can also be provided with conduits extending into the tank by which samples of the oil within the tank can be removed for analysis.

The system and operation of the present invention will now be described with particular reference to FIG. 5, from which most internal details of the enclosure 14 and tank 26 have been omitted for the sake of clarity. FIG. 5 is generally schematic in nature.

As shown in FIG. 5, the system of this invention utilizes a number of conduits, valves, pumps and other devices. The system goes through four stages, during which certain of the valves will be open or closed and certain of the pumps will be in operation. The valves are identified by the reference characters V1 to V11, and the four stages are identified as follows: Fill, Auto Sequence, Clean Oil Transfer and Waste. Table 1 shows the position of the valves as open (O) or closed (C) during the various stages.

TABLE 1

| VALVE | FILL | AUTO SEQUENCE | CLEAN OIL TRANSFER | WASTE TRANS-FER |
|---|---|---|---|---|
| V1 | O | C | C | C |
| V2 |  | SEE BELOW |  |  |
| V3 |  | SEE BELOW |  |  |
| V4 |  | SEE BELOW |  |  |
| V5 | O | O | O | O |
| V6 | O | O | O | O |
| V7 | C | C | O | C |
| V8 | C | C | SEE BELOW | C |
| V9 | C | C | O | C |
| V10 | O | O | O | O- |
| V11 | C | C | C | C |

V2 is open to the tank in Auto Sequence and to drain 84 for Waste Transfer.
V3 is open to pump 98 in Auto Sequence to oil collector 114 at end of Waste Transfer.
V4 is open from pump 98 to the tank when in Auto Sequence and to the waste oil tank for Waste Transfer.
V8 is open as an oil purge line before Clean Oil Transfer.
The four stages will now be described in some detail.

FILL

Assuming tank 26 to be empty, the valves are set as in Table 1, and used oil is pumped from a used oil tank (not shown) through conduit 96, valve V1 to the inlet conduit 52. The oil level rises within the tank 26 with the float 70 floating on top of the oil. As the level rises, the arm 66 pivots to permit the float 70 to remain on top of the oil. The float 70 (or arm 66) may be connected to appropriate sensors to shut off the flow of oil to tank 26 when the desired level within the tank has been reached. Valve V1 is then closed.

AUTO SEQUENCE

Before anything is done to treat the used oil, it must be brought up to an effective operating temperature in the vicinity of 110° C. Once that temperature has been reached, the mix pump 98 is started, and oil from tank 26 passes through mix outlet conduit 100 (FIG. 2), valves V2, V3 and V4, and conduit 102 to return conduit 54. The circulating oil is sprayed over the oil surface through nozzle 59 to dry the oil thoroughly. This also assists in reducing the light ends (fuel dilution). As this is occurring, the air space above the oil is force ventilated by the fan 46.

After an appropriate period of operation, the heaters within the tubes 86 in the tank 26 are turned off while the fan 46 and pump 98 continue to operate. This continues until the oil in tank 26 cools to about 95° C. Once the lower temperature has been reached, valves V5 and V6 are opened to admit a small amount of coagulant, such as that sold under the trademark LAUNDEROL, from a supply tank 104 and into the mix cycle, between valves V2 and V3. The appropriate amount of coagulant is usually about 1½% to about 4% by volume.

After introduction of the coagulant into the circulating oil, the heaters within the conduits 86 and pump 98 are turned off, and the oil in the tank 26 is left to stand quietly while its temperature is maintained at no less than 90° C. by way of the heated air space 42, kept warm by heaters within the perforated conduits 90. The heated air, forced to circulate within the insulated air space or chamber 42, provides a thermal blanket all around the tank 26, ensuring a constant-temperature oven-like condition. During this holding phase, the coagulant works on the impurities in the used oil and causes them to settle towards the bottom of the tank, leaving clean, reusable oil in the upper part of the tank.

Samples of the clean oil can be taken periodically, and once an acceptable grade of oil has been obtained, the clean oil pump 106 is started. Clean oil is drawn through the opening 76 in arm 66, held just below the surface by float 70. The oil exits through conduit 60, through valve V7, pump 106, filter 108, valve V9, meter 110 and valve V10 to a clean oil tank from which clean oil may be extracted for use in locomotives or other engines or machinery.

The chain 74, connected to float 70, determines the amount of clean oil that can be removed from the tank 26. The chain may be adjusted in length so that it does not permit opening 76 to go below the clean/waste oil interface. After the clean oil has been removed from tank 26, valve V2 is switched to pass oil from drain conduit 84 through valve V3, pump 98 and switched valve V4 to a waste oil tank (not shown) connected by a conduit 112. Valve V3 is then switched so that it can pass any oil collected in oil collector 114 to the waste oil tank. The collector 114 accepts any oil fed to it through valve V8 and conduit 116 which are used at the start of the clean oil transfer stage to purge the lines leading from the tank 26 to ensure that no contaminants enter the clean oil to be transferred.

The system of this invention may be fully automated by utilizing appropriate pneumatic or electrical sensors and controls, and accordingly, it is possible to operate the system with limited operator input. Of course, all of the valves and controls can be manually operated if desired. For a relatively small investment, a facility which would normally use many thousands of gallons of lubricating oil in a short period of time, is able to reclaim a good percentage of its otherwise waste oil and is thus able to realize a substantial saving in oil costs.

The description as presented herein relates to a typical installation of the present invention. Each installation will, possibly, necessitate specific alterations in the system as described, and such alterations will clearly be within the capabilities of a skilled practioner in the art. Thus the protection to be afforded the invention should be ascertained from the claims appended hereto.

I claim:

1. An oil clarifier for use in a recovery system for used lubricating oil, comprising a tank having top, bottom, side and end walls forming an upper portion and a lower portion for receiving a predetermined volume of used lubricating oil, an enclosure having top, bottom side and end walls surrounding the corresponding said walls of said tank and spaced outwardly therefrom, means for supporting and spacing said tank within said enclosure to define a fluid chamber completely surrounding all of said walls of said tank, insulation means mounted on said enclosure, said insulation means spaced outwardly from said tank and extending completely around said fluid chamber to limit heat transfer from said fluid chamber through said enclosure, means for introducing used lubricating oil into said tank, first heater means for heating the oil within said tank, means including a pump and a conduit externally of said tank for recirculating the heated oil within said tank, means for introducing a coagulant into the oil for recirculation with the oil by said recirculating means, second heater means for heating a fluid within said chamber surrounding said tank to create a thermal blanket and oven-like condition completely around all of said walls of said tank including said top wall to maintain said tank and the oil within said tank at a constant temperature for an extended time period to avoid circulation of the heated oil within said tank during the time period for obtaining effective precipitation of coagulated impurities within the heated oil, and means for removing clarified oil from said upper portion of said tank after coagulated impurities have precipitated from the oil in said lower portion of said tank during said time period.

2. An oil clarifier as defined in claim 1 wherein said second heater means for heating the fluid within said chamber comprise conduits extending into said chamber and having axially spaced openings for directing hot air through said conduits.

3. An oil clarifier as defined in claim 1 wherein said insulation means comprise a layer of insulation attached to an inner surface of each of said walls of said enclosure, and said fluid chamber is defined between all of said layers and said tank.

4. An oil clarifier for use in a recovery system for used lubricating oil, comprising a rectangular box-like tank having top, bottom side and end walls forming an upper portion and a lower portion for receiving a predetermined volume of used lubricating oil, a rectangular box-like enclosure having top, bottom, side and end walls surrounding the corresponding said walls of said tank and spaced outwardly therefrom in corresponding parallel relation, means for supporting and spacing said tank within said enclosure to define a box-like fluid chamber completely surrounding said tank, insulation means mounted on all of said walls of said enclosure, said insulation means spaced outwardly from said tank and extending completely around said fluid chamber to limit heat transfer from said fluid chamber through said enclosure, means for introducing used lubricating oil into said tank, first heater means for heating the oil within said tank, means including a pump and a conduit externally of said tank for recirculating the heated oil within said tank, means for introducing a coagulant into the oil for recirculation with the oil by said recirculating means, second heater means for heating a fluid within said chamber surrounding said tank to create a thermal blanket and oven-like condition completely around all of said walls of said tank including said top wall to maintain said tank and the oil within said tank at a constant temperature for an extended time period to avoid circulation of the heated oil within said tank during the time period for obtaining effective precipitation of coagulated impurities within the heated oil, and means for removing clarified oil from said upper portion of said tank after coagulated impurities have precipitated from the oil in said lower portion of said tank during said time period.

5. A method of clarifying used lubricating oil, comprising the steps of supplying a predetermined volume of used lubricating oil into a tank having top, bottom, side and end walls forming an upper portion and a lower portion, completely surrounding the tank with an enclosure having top, bottom, side and end walls spaced outwardly from the corresponding walls of the tank to define a fluid chamber completely surrounding the tank, attaching insulation to the enclosure, extending the insulation completely around the fluid chamber spaced outwardly from the tank to limit heat transfer from the fluid chamber through the enclosure, heating the oil within the tank, recirculating the heated oil outwardly from the tank and then back into the tank, introducing a coagulant into the heated oil for recirculation with the oil, stopping the recirculation of the heated oil within the tank, heating a fluid within the chamber surrounding the tank to create a thermal blanket and oven-like condition completely around all of the walls of the tank including the top wall, using the heated fluid to maintain the tank and the oil within the tank at a constant temperature for an extended time period to avoid circulation of the heated oil within the tank during the time period for obtaining effective precipitation of coagulated impurities within the oil, and removing clarified oil from the upper portion of the tank after coagulated impurities have precipitated from the oil into the lower portion of the tank during the time period.

6. A method as defined in claim 5 wherein the tank defines an air space above the surface of the oil within the tank, the oil within the tank is heated to a temperature of about 110 degrees C. after which the oil is recirculated, spraying the recirculated hot oil through a nozzle onto the surface of the oil within the tank for converting the moisture in the oil into vapor, and force ventilating the air above the oil surface within the tank while the oil is being sprayed onto the surface to remove the moisture vapor.

7. A method as defined in claim 6 and including the step of allowing the heated oil to cool to a temperature of about 90 degrees C. after the moisture is removed and the coagulant is introduced, and maintaining the oil within the tank at the temperature of about 90 degrees C. for the extended time period.

* * * * *